Feb. 13, 1945.　　　W. S. DWYER　　　2,369,546
MACHINE TOOL
Filed March 16, 1943　　2 Sheets-Sheet 1

INVENTOR
William S. Dwyer
BY
Paul M. Grist
ATTORNEY

Feb. 13, 1945. W. S. DWYER 2,369,546
MACHINE TOOL
Filed March 16, 1943 2 Sheets-Sheet 2

INVENTOR
William S. Dwyer
BY
Paul M. Geist
ATTORNEY

Patented Feb. 13, 1945

2,369,546

UNITED STATES PATENT OFFICE 2,369,546

MACHINE TOOL

William S. Dwyer, Devon, Conn., assignor to The Bullard Company, a corporation of Connecticut Application March 16, 1943, Serial No. 479,343

12 Claims. (Cl. 82—21)

This invention relates to machine tools, and particularly to a new and improved mechanism for actuating a tool slide of a machine tool.

A tool holder of a machine tool is often required to move along two paths, usually at right angles to each other. In so doing, it is advantageous to provide a dwell, or a hesitation of the motion of the tool, at certain points along its path of travel. Usually when it is desired to machine two surfaces on a work piece of revolution at right angles to each other, it is necessary to provide this dwell at the point of intersection of the two surfaces. Furthermore, when it is desired to move a tool along two intersecting paths, it is often necessary to provide a dwell at the end of movement along the second path and prior to withdrawing the tool from engagement with the work. The purpose of the dwell, of course, is to clean up the metal at the point where such dwell is needed by permitting the work to rotate one or more revolutions after the tool feed has stopped. Compound tool slides are employed to produce this dual motion. They usually include two portions, one of which is mounted upon the other and each of which is adapted to be moved in both directions along a different path.

Many devices have been designed for providing dwells to the tool movement in mechanisms of this character. These devices, however, invariably have been complicated, expensive and difficult to maintain in proper operating condition.

An object of this invention is to provide a compound tool slide that will overcome the above and other difficulties of prior known structures.

Other objects of the invention include the provision of a compound tool slide in which a lost-motion connection is provided at certain points in the path of travel of the tool; the provision of a compound tool slide in which screws are employed for effecting movement of the slide along both paths; the provision of a compound tool slide in which the slides are releasably locked together through the agency of a rack, pinion and locking mechanism which are adapted upon release to actuate a screw for providing one motion of said compound slide; and the provision of a compound tool slide including a rack, pinion and screw for providing one movement of the tool slide, and in which a lost motion connection is provided between the screw and the pinion.

The above, as well as other objects and novel features of the invention will become apparent from the following specification and accompanying drawings, in which.

Figure 2:
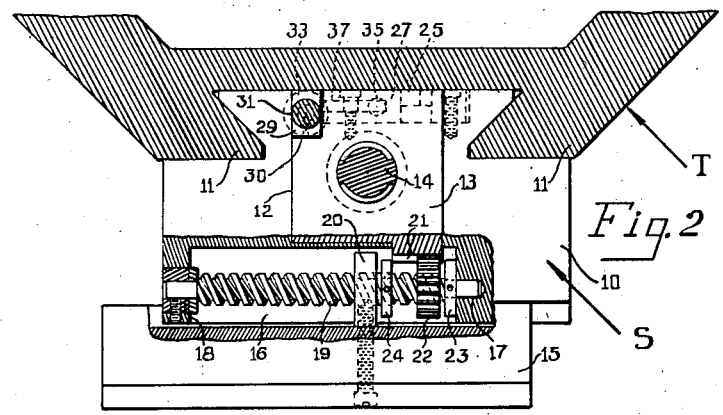
Fig. 2 is a top plan view of the structure shown in Fig. 1.

Referring to the drawings, the invention is shown as applied to a compound tool slide S mounted for vertical reciprocable movement along a standard T. The slide S is made up of a base portion 10 dove-tailed to the standard T (Fig. 2) in a manner such that it is adapted to slide along ways 11 formed by such dove-tail construction.

Figure 3:
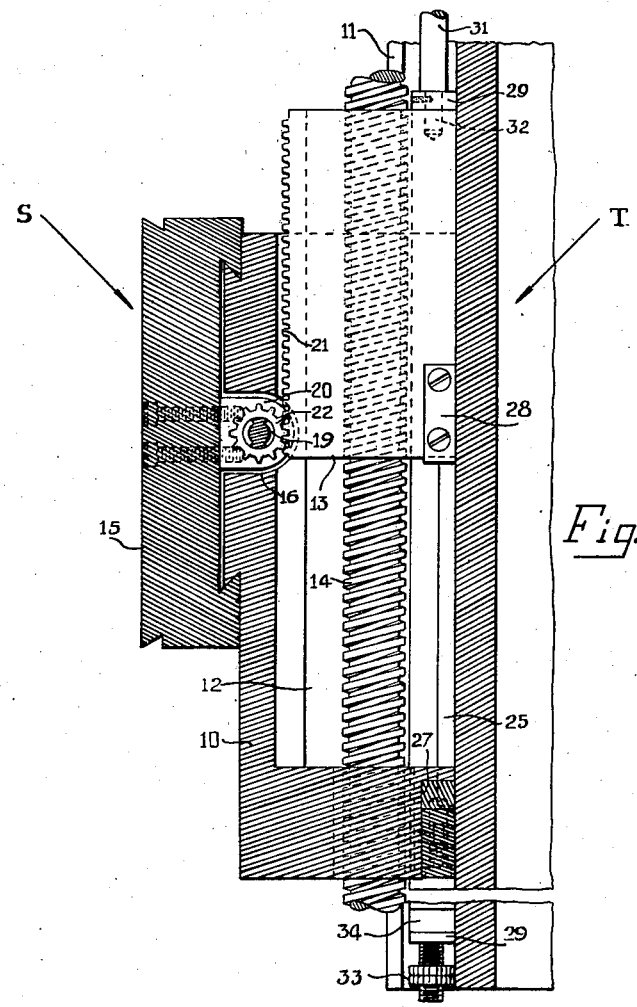
Fig. 3 is a section taken substantially along line 3—3 of Fig. 1.

Referring to Fig. 3, the base 10 is provided with a recess 12 within which an actuating member 13 is adapted to be reciprocably moved. The member 13 is adapted to be moved in both directions by a reversely rotatable screw 14 that extends downwardly through the bottom of the base portion 10. The one surface of the base 10 is provided with a dove-tail portion along which a cross slide 15 is adapted to be moved in two directions. The cross slide is adapted to be moved at right angles to the movement of the base 10. A recess 16 is provided in the one surface of the base 10, forming bearings 17 and 18 (Fig. 1) within which is journaled a screw 19. A nut 20, fixed to the back of the cross slide 15, is threaded on the screw 19. Accordingly, rotation of the screw 19 will effect movement of the cross slide 15. Rotation of the screw 19 is effected by the movement of the actuating member 13 relatively to the slide 10. Accordingly, a rack 21 is provided on the one surface of the member 13 in mesh with a pinion 22 that is threaded on the screw 19. Abutment members 23 and 24 are fixed to the screw 19 on each side of the pinion 22. These abutment members are spaced apart an amount substantially greater than the thickness of the pinion 22. Accordingly, as the member 13 moves downwardly relatively to the slide 10 (Fig. 1), the pinion 22 will make several revolutions before it contacts abutment 24—providing a lost-motion, or dwell before it begins to rotate the the screw 19 to effect the cross movement of the slide 15. Furthermore, at the end of the cross movement of the slide 15, and upon the initial upward movement of member 13 relatively to slide 10, the pinion 22 will make several revolutions before it engages abutment 23—providing a dwell at the end of the cross slide movement, before it begins to rotate the screw 19 to reversely move slide 15.

The base 10 and cross slide 15 are adapted releasably to be locked together during a portion of the compound movement thereof. They are adapted to be released at a predetermined point in the path of travel of the base or slide 10, whereupon the cross slide 15 is adapted to be moved independently of the base 10. Although the releasable locking means between the slides 10 and 15 may be of any one of many designs, the one disclosed is specifically shown and described in U. S. Patent No. 1,382,339 granted to E. P. Bullard, to which patent attention is directed for constructional features not specifically described herein.

Figure 1:
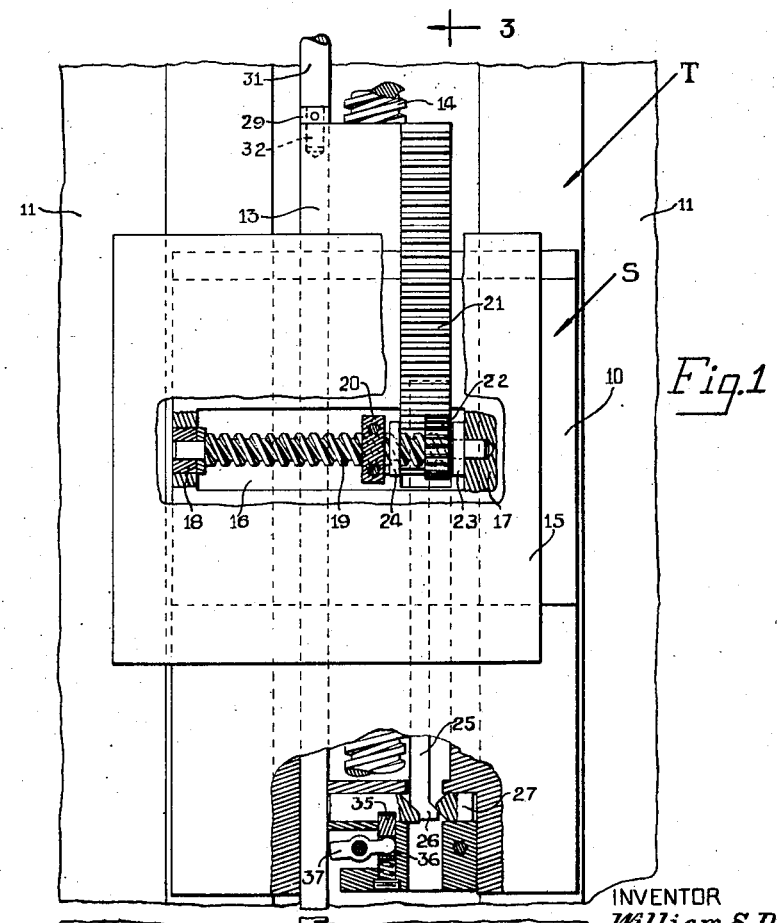
Fig. 1 is a front elevational view of a portion of a machine tool disclosing a compound tool slide, parts being broken away to show various features of construction.

Referring to Fig. 1, this releasable locking mechanism comprises an arm 25 rigidly attached to the actuating element 13 by clamping mechanism 28 (Fig. 3). The arm 25 is provided with a cam portion 26 at its lower end that cooperates with a cam 27 mounted for reciprocation at right angles to the direction of motion of the arm 25. The cam portion 26 and the cam 27 comprise the locking means between the base 10 and the cross slide 15. Upon release of this locking means, the arm 25 is permitted to descend and consequently the member 13 moves relatively to the base 10 thereby rotating the pinion 22.

The cam 27 is held in the position shown in Fig. 1 by an adjustable, normally-stationary rod 29. The rod 29 extends from the lowest point of travel of the compound slide, upwardly through a recessed portion 30 in the member 13 (Fig. 2). Rod 29 is connected at its upper extremity to a rod 31 that is fixed to the standard T, or to a rigid portion of the machine. Rods 29 of different length may be employed, and they are adapted to be attached to the rod 31 by the pinned connection 32. The lower portion of the rod 29 is threaded and supports a tripping nut 33 adjustably mounted thereon. The lower end of this rod is also provided with a recess 34 within which the cam 27 is adapted to be moved when the tripping mechanism is rendered effective by the nut 33. The cam 27 is normally locked in the position shown in Fig. 1 by a spring-pressed detent 35. The detent 35 is provided with a recess 36 within which one end of a pivotally-mounted trip lever 37 extends. The opposite end of the trip lever 37 is in line with the nut 33, and as the locked slides move downwardly due to the rotation of the screw 14, the free end of the lever 37 engages the nut 33, withdrawing the detent 35 from the cam 27. Further downward movement of the member 13 causes the arm 25 and its cam 26 to force the cam 27 leftwardly as viewed in Fig. 1 into the notch 34. Such action rigidly locks the base 10 from further movement and continued rotation of the screw 14 in the same direction causes continued downward movement of the member 13, arm 25 and cam portion 26. Such continued downward movement of the member 13 causes several revolutions of the pinion 22 to take up the lost motion between it and abutment 24—providing one of the desired dwells. Engagement between pinion 22 and abutment 24 causes the screw 19 to rotate, thereby moving the cross slide 15.

At the end of the cross slide motion, the rotation of the screw 14 is adapted to be reversed to withdraw the tool from the work. Upon reversing the rotation of screw 14, the pinion 22 is caused to make several revolutions before it abuts the member 23, thereby providing a dwell at the other desired point. Continued upward movement of the member 13 relatively to the slide 10 rotates the screw 19 in such a direction to withdraw the cross slide 15. Since the bar 25 and the cam 26 rise with the upward movement of the member 13, the cam 26 eventually cooperates with the cam 27 to withdraw it from the notch 34, and to lock the base 10 to the cross slide 15. Continued upward movement of member 13 raises both slides 10 and 15 as a unit, at the beginning of which unitary movement the spring-pressed detent 35 re-seats in the recess of cam 27, thereby locking it.

Although the various features of the new and improved tool slide mechanism have been shown and described in detail to fully disclose one embodiment of the invention, it will be evident that numerous changes may be made in such details, and certain features may be used without others without departing from the principles of the invention.

What is claimed is:

1. In a machine tool, a member adapted to be moved in two directions along a path; a screw adapted to be rotated in both directions for moving said member; means for rotating said screw; and means between said screw and said screw-rotating means for providing lost motion at the beginning of each reversal of rotation of said screw.

2. In a machine tool, a member adapted to be moved in two directions along a path; a screw adapted to be rotated in two directions for moving said member; a rack and a pinion adapted to rotate said screw; and means between said screw and said pinion for providing lost motion at the beginning of each reversal of rotation of said screw.

3. In a machine tool, a member adapted to be moved in two directions along a path; a screw adapted to be rotated in two directions for moving said member; a rack; a pinion in mesh with said rack and threaded onto said screw; means for providing relative movement between said rack and pinion; and means between said screw and pinion for providing lost motion at the beginning of each reversal of rotation of said screw.

4. In a machine tool, a member adapted to be moved in two directions along a path; a screw adapted to be rotated in two directions for moving said member; a rack; a pinion threaded onto said screw and in mesh with said rack; a plurality of stops fixed to said screw on either side of said pinion and spaced apart a distance greater than the width of said pinion; and means for providing relative movement between said rack and pinion.

5. In a machine tool, a member; means for moving said member in two directions along a path; an element mounted on said member and adapted to be moved in two directions along a separate path; means for releasably locking said member and element together so that they move as a unit along the path of movement of said member; means adapted to be tripped at predetermined points along the path of movement of said member to thereby release said element from said member; a screw mounted on said member to which said element is threaded; and means for rotating said screw in both directions by the means that moves said member.

6. In a machine tool as claimed in claim 5, in which said member is releasably held against movement when said releasable means is tripped.

7. In a machine tool as claimed in claim 5, in which said screw-rotating means comprises a rack and pinion.

8. In a machine tool as claimed in claim 5, in which the means that moves said member comprises an oppositely rotatable screw; an implement threaded onto said screw; and the means for rotating the member-supported screw comprises a rack attached to said implement; and a pinion on said member-supported screw adapted to mesh with said rack.

9. In a machine tool, a member; means for moving said member in two directions along a path; an element mounted on said member and adapted to be moved in two directions along a separate path; means for releasably locking said member and element together so that they move as a unit along the path of movement of said member; means adapted to be tripped at predetermined points along the path of movement of said member to thereby release said element from said member; a screw mounted on said member to which said element is threaded; means for rotating said screw in both directions and means between said screw and said screw-rotating means for providing lost motion at the beginning of each reversal of rotation of said screw.

10. In a machine tool as claimed in claim 9, in which said screw-rotating means comprises a rack and a pinion adapted to cooperate with said screw.

11. In a machine tool as claimed in claim 9, in which said screw-rotating means comprises a rack adapted to mesh with a pinion threaded onto said screw.

12. In a machine tool as claimed in claim 9, in which said screw-rotating means comprises a rack; a pinion threaded onto said screw; and a plurality of stops fixed to said screw on opposite sides of said pinion and spaced apart a distance greater than the width of said pinion.

WILLIAM S. DWYER.